Oct. 12, 1926.
C. W. WILHELMS
1,603,177
COMBINATION DISK WHEEL
Filed March 12, 1926
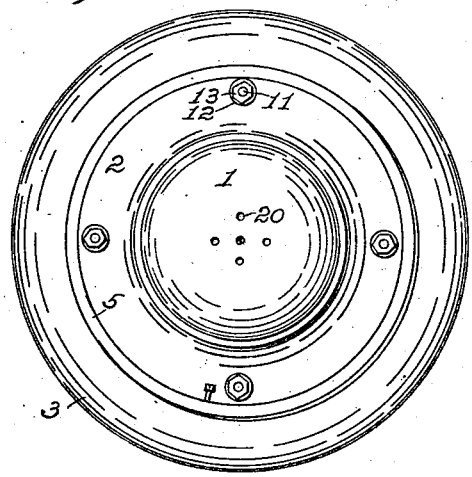
Fig. 1.
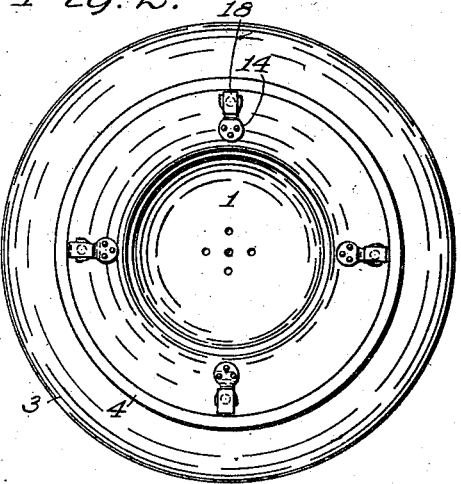
Fig. 2.
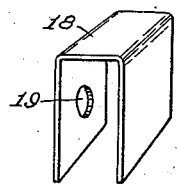
Fig. 5.
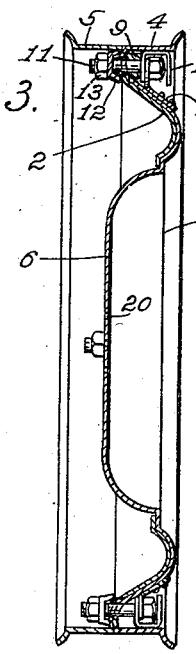
Fig. 3.
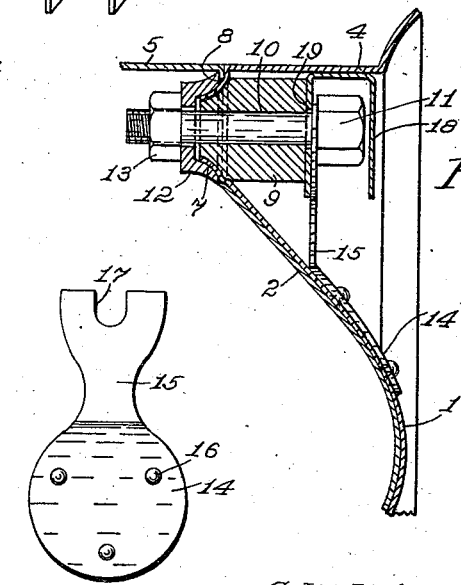
Fig. 4.
Fig. 6.
Inventor
C. W. Wilhelms
By
Attorney Patented Oct. 12, 1926.

1,603,177

UNITED STATES PATENT OFFICE.

CHRISTIAN W. WILHELMS, OF PARKERSBURG, IOWA.

COMBINATION DISK WHEEL.

Application filed March 12, 1926. Serial No. 94,261.

My invention relates to improvements in combination disk wheels, as carrying wheels for motor vehicles, and the object of my improvement is to furnish a sectional wheel of this class which combines but two structural parts to provide a discoidal center web and a separable rim to detachably hold a pneumatic tire.

Another object is to supply separable interlocking fastening devices with which to secure said sectional parts together.

With the foregoing and other objects in view which will appear as the description proceeds, the invention resides in the combination and arrangement of parts and in the details of construction hereinafter described and claimed, it being understood that changes in the precise embodiment of invention herein disclosed can be made without in the scope of what is claimed without departing from the spirit of the invention.

In the annexed drawings, Figs. 1 and 2 are respectively outer and inner faces of my disk wheel and combined rim with tire, taken in elevation. Fig. 3 is a vertical axial section of said parts taken on a somewhat larger scale. Fig. 4 is a detail cross section on a still larger scale of parts of the disk web and the rib as secured together by my improved fastening and interlocking devices. Fig. 5 is a detail perspective view of the elastic U-shaped stop device, and Fig. 6 is an elevation of one of the forked clips, of said fastening and interlocking devices.

My disk wheel is believed to comprise fewer parts than other wheels of that class, and has the advantage that it has a combination disk and sectional rim so constructed and assembled that a tire may be mounted or demounted thereon without the necessity for carrying an extra rim.

It is further thought that the wheel is strengthened to an unusual degree by the assembling of parts of the disk and rim in juxtaposition so as to reinforce the structure in resisting both vertical strains and torsion such as are commonly experienced while the wheel is heavily loaded, rotating over rough surfaces at high speed, and violently thrust against obstructions while the direction of the vehicle is being changed.

My improved disk wheel is made up essentially of but two body parts, a pressed metal central disk web 1 which also has an integral outer rim segment 4, and an assembled overlapping disk part 2 which also has an integral outer rim segment 5, and said pair of parts when assembled may be separably secured together by interlocking fastening devices to be hereinafter described.

The cooperating rim segments 4 and 5 have straight sides to hold a tire 3 of that type, but may be made with "clincher" sides. While the central web of the wheel as including parts of the sections 1 and 2 may be flat, yet I prefer that the overlapped parts thereof be annularly concaved outwardly as illustrated in Fig. 3, and that the section 1 may be shaped with a relatively large central dishing inwardly at 6 to be convex outwardly, and holes 20 may be provided at the center of the dishing 6 to receive means for fastening thereto a hub member not shown. This annularly channeling and central bossing of said sections greatly stiffens the wheel web, while the hub may be mounted approximately within the center of the wheel itself preventing such torsional strains as might occur otherwise.

I have adopted interlocking fastening devices for securing said sections rigidly together, and which are of such a nature as to be readily detached when desired. As these devices are thus secure, but few are required, and I prefer to employ but four sets, placed in an equidistant space from each other.

As better shown in said Fig. 4, the section 2 near the rim part 5 has apertures 8, rimless, and the section 1 has at corresponding locations apertures with raised frustal edges 7 which pass through the alined apertures 8 in the overlapped section 2. A headed bolt 11 has its stem passed through said alined apertures and is mounted in engagement with other devices in fastening the sections together as follows: The numerals 9 and 12 respectively denote cooperating locking elements, of which the element 9 has one end shaped conically, while the other element 12 has a socket of similar inward shape, so that the coned end of the element 9 may fit within the frustal rim 7, while the coned hollow of the member 12 may fit upon the coned outer surface of the rim 7. Both of the elements 9 and 12 are bored as at 10 in alinement to loosely seat the bolt 11. A nut 13 on the threaded stem of the bolt 11 serves to clamp the socketed member 12 upon the rim part 7.

The head of the bolt would ordinarily engage the rear end of the element 9 to thus clamp the element 9 against the rear face of the rim 7 to secure the sections 1 and 2 together. In order to prevent the bolt from working out rearwardly when the nut is not upon the bolt while the sections are being manipulated, I have provided holding means as follows: The numeral 18 denotes a U-shaped spring member having a bolt hole 19 in one of its limbs, whereby the bolt may be passed through said hole when the other limb has been yieldingly spread apart for sufficient clearance to react when released. The numeral 14 denotes an anchoring device riveted at 16 to the section 1 and has a diminished part or arm 15 projecting toward the rim part 4 and shaped terminally with a fork 17 which may ride upon the bolt stem. When the elements 9 and 12 have been assembled as above described at opposite sides of the frustal rim 7 to engage it, the U-shaped device 18 being located to have its apertured limb between the element 9 and the fork 17, the other limb may be spread out and the bolt inserted through the alined holes of said elements, and the nut 13 seated and tightened on the bolt. This secures all these structures tightly together, and interlockingly, so that relative displacements of the said devices from each other or from the sections is prevented. When the nut is removed, the outer limb of the device 18 acts as an abutment to prevent the escape rearwardly of the bolt, because of the binding of the anchoring part 15—17 upon the device 18—19.

With the above construction it is thought that tire replacements are made more quickly in being placed upon the section 1 first, where the operator can locate the valve-stem alinement easily, as the rim carries an aperture for said stem.

Having described my invention, what I claim as new, and desire to secure by Letters Patent, is:—

1. In a wheel of the class described, a central web composed of overlapped concentric sections, both sections including integral rim portions which cooperate to hold a pneumatic tire, said sections having alined apertures in their overlapped parts, one of the sections having frustal rims about their said apertures which traverse the alined apertures in the other section, and fastening devices inserted in said communicating apertures including elements shaped to fit within the said frustal rims and other elements shaped to fit over said frustal rims whereby said fastening devices are interlocked with each other and with said sections.

2. In a wheel of the class described, a central web composed of overlapped concentric sections, both sections including integral rim portions which cooperate to hold a pneumatic tire, said sections having alined apertures in their overlapped parts, fastening devices mounted in the alined apertures to detachably secure the sections together, anchoring elements fixed upon one section having terminal engaging means to engage with said fastening devices, and elastic clips mounted upon the fastening devices and engaged releasably by said anchoring elements to resist endwise displacements of the fastening devices.

In testimony whereof I affix my signature.

CHRISTIAN W. WILHELMS.